United States Patent [19]

Jackson

[11] Patent Number: 5,775,834
[45] Date of Patent: Jul. 7, 1998

[54] PORTABLE HIGHWAY WARNING DEVICE WITH FRANGIBLE RETAINER RING

[76] Inventor: Brian G. Jackson, 11 Briarwood Dr., Somerset, N.J. 08873

[21] Appl. No.: 514,854

[22] Filed: Aug. 14, 1995

[51] Int. Cl.⁶ .................................................. E01F 9/047
[52] U.S. Cl. ........................ 404/15; 116/63 P; 116/67 R
[58] Field of Search .................................. 404/9, 15, 16, 404/32; 116/63 P, 63 R, 67 R

[56] References Cited

U.S. PATENT DOCUMENTS

| | | | |
|---|---|---|---|
| 3,880,537 | 4/1975 | Harris et al. | 404/15 |
| 4,012,156 | 3/1977 | Turner. | |
| 4,203,685 | 5/1980 | Sanchez. | |
| 4,342,525 | 8/1982 | Mastronuzzi. | |
| 4,362,424 | 12/1982 | Barber. | |
| 4,542,709 | 9/1985 | Spaugh. | |
| 4,697,294 | 10/1987 | Schafer. | |
| 4,715,743 | 12/1987 | Schmanski. | |
| 4,813,811 | 3/1989 | Adams. | |
| 5,059,060 | 10/1991 | Steinhardt. | |
| 5,106,226 | 4/1992 | Fanslow et al. | 404/15 |

FOREIGN PATENT DOCUMENTS

| | | | |
|---|---|---|---|
| 2618529 | 11/1977 | Germany | 404/15 |
| 2079356 | 1/1982 | United Kingdom | 404/15 |
| WO91/19856 | 12/1991 | WIPO | 404/15 |

*Primary Examiner*—James Lisehora
*Attorney, Agent, or Firm*—William L. Muckelroy; Gary N. Lipson

[57] ABSTRACT

A warning device adapted to be laid flat upon a road way produces an audible warning sound when contacted by the wheels of a moving vehicle. The device is comprised of a mat of flexible resilient material having an elongated configuration, and a series of semi-rigid apertured raised longitudinal bumps each with a plurality of segments therein forming a segmented metal bar contained therein and extending throughout the length of each bump. The bumps are spaced a few inches at most over a distance of two to three feet which allows resonant sound from the vibration of the bars and frictional interaction of short segments making up the bars to be transmitted to an overpassing vehicle traveling at high speeds. In addition, the segmented bars reinforce and extend the life of the mat. The warning sound, is produced when the various segments of the bars are differentially downwardly deflected by an overpassing tire thus creating an unusual audible warning essentially without the outer parts of the warning device touching each other and thereby wearing. By virtue of its specialized construction, the device can be rolled into a compact storage state which can be contained in the trunk of an automobile. A frangible metal or plastic ring is used to retain the mat device in a rolled state prior deployment. The mat is deployed by breaking the frangible part of the ring thereby allowing the mat to unfold.

6 Claims, 2 Drawing Sheets

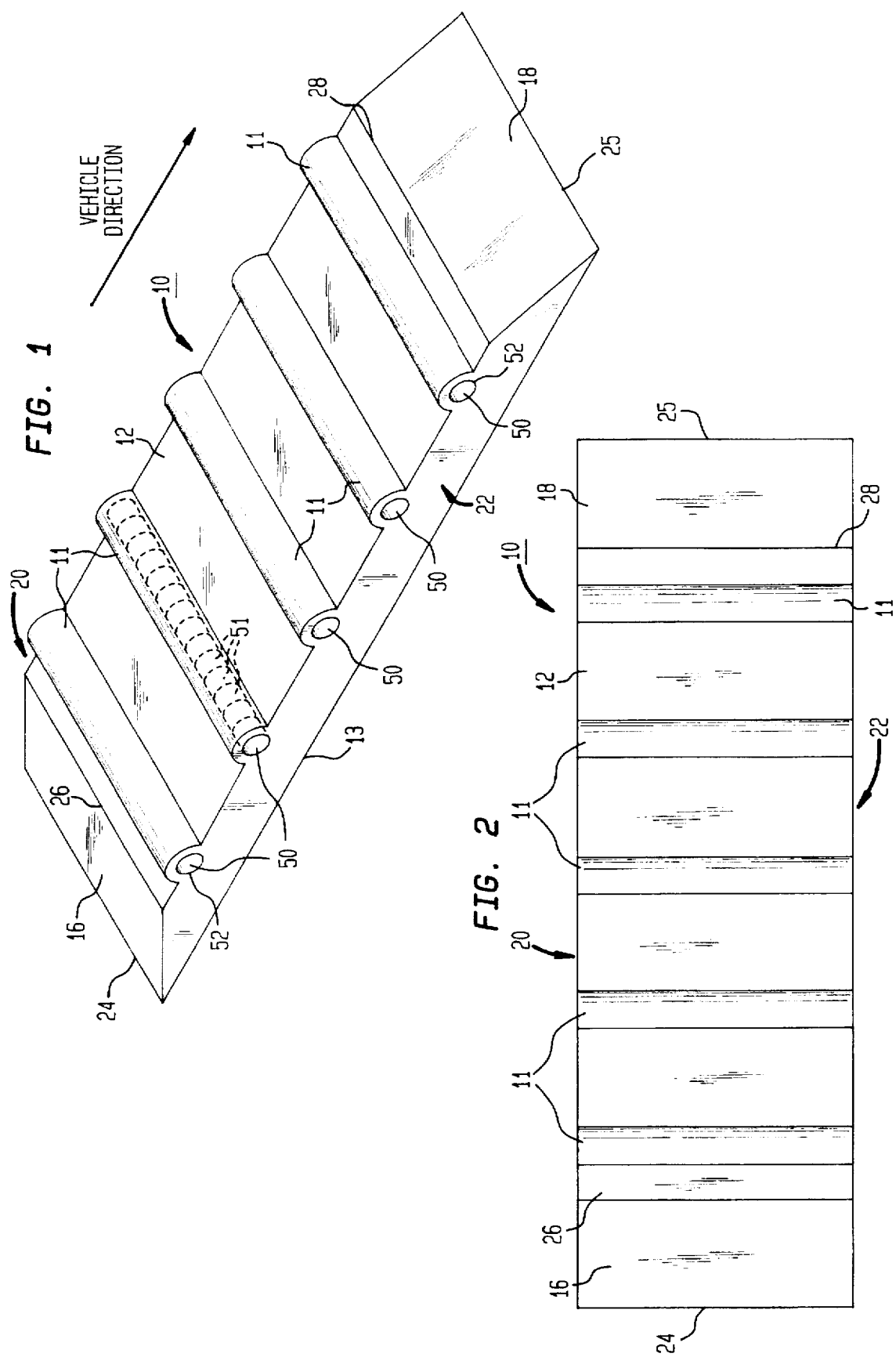

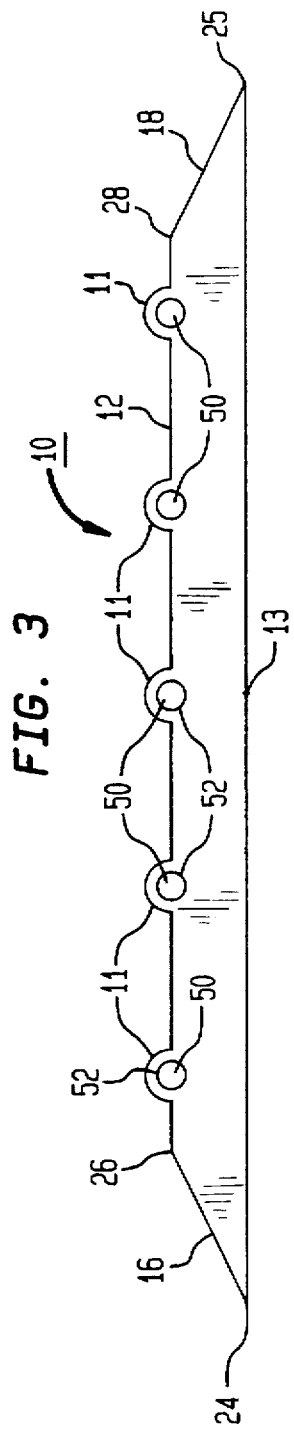
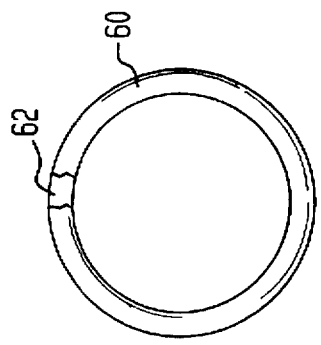
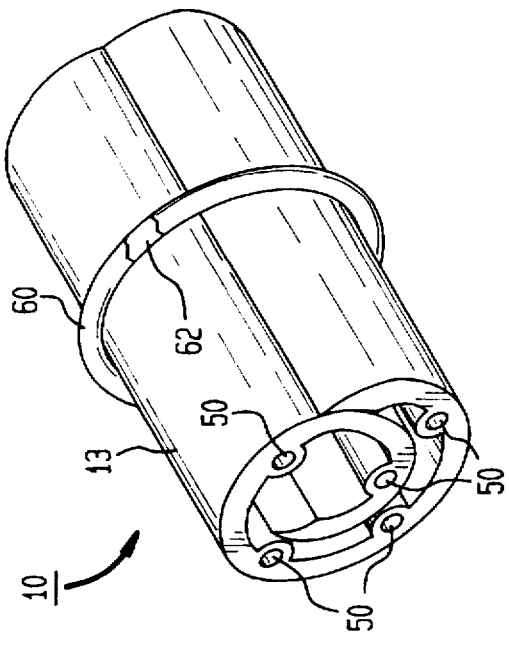

PORTABLE HIGHWAY WARNING DEVICE WITH FRANGIBLE RETAINER RING

BACKGROUND OF THE INVENTION

1. Field of the Invention.

This invention is related to warning means for a driver of an automotive vehicle to potential hazardous driving conditions, and more particularly to a warning device interactive between a vehicle moving on the roadway upon which the vehicle travels.

2. Description of the Prior Art.

Most highway warning systems in present use rely upon visually perceivable characteristics such as flares, flags, signs, barriers, lane markers and the like. Although effective under mild weather conditions permitting good visibility, such visually perceived devices lose effectiveness under conditions of fog, snow storms and heavy rain, particularly during night hours. Certain easily developed lightweight highway markers are easily blown away in moderate wind, and occupy considerable storage volume.

Highway warning systems which rely upon audibly perceivable characteristics such as horns and sirens find use particularly by vehicles as a means for alerting vehicles. Specially grooved highway surfaces are in use which produce sound and vibration when the tires of the vehicle roll over the grooves. Such groove faces, however, are fixed installations which do not warn of any unusual hazard of a transient nature but instead indicate special road conditions such as a pending sharp curve, which always require more the usual amount of driving caution. There is a strong and long-felt need among various state troopers for a portable device which is easily and quickly deployable at accidents and other emergent hazards and which is economical and reusable.

The grooved surfaces of permanent devices and portable devices which rely on flexible movable parts for interaction lose effectiveness in the Northeast in extremely cold temperatures and when coated with accumulations of less than one inch of ice or snow. Another limitation of grooved roadways and portable grooves using vertically extended multiple strips of flexible material is that such expedient an expedient wears quickly in cold wear with the vertical strips sometimes breaking off at their base.

In 1977 Turner et al. were issued U.S. Pat. No. 4,012,156 for a retractable safety speed bump. It was a permanently installed warning device extendable from a permanent recess in a roadway and retractable to a nested position flat with the roadway. A separate tool was adapted to extend the bump and provided therewith. In 1980 Sanchez received U.S. Pat. No. 4,203,685 for a speed arrester made of an elongated single member having a generally semi-circular cross-section and a lower flat surface permanently secured to the roadway by an adhesive material. The single member was hollow having unfilled apertures therein to increase resiliency of the member which was made of an elastomer. The function of the open apertures was to provide a thump or thrust to the vehicle detectable by an occupant as the vehicle pass over the backside of the single arrester.

In 1982 Mastronuzzi received U. S. Pat. No. 4,342,525 for another kind of permanently imbedded retractable speed bump incorporating bearings and hydraulically actuated and later that year Barber was issued U. S. Pat. No. 4,362,424 for a permanently imbedded speed bump adapted to impart a controlled jar to overpassing vehicles using fluid housed in a sealed flexible chamber.

In 1987 Scafer of Germany received U.S. Pat. No. 4,697,294 for a resilient prismatically shaped ramp and speed bump structure made of several contiguous plates fixable to the highway surface with screws and designed to replace rigid individual round asphalt or concrete bumps. Schmanski received U.S. Pat. No. 4,715,743 for a bumped tile to be placed on walkways to aid the visually handicapped. One structure utilizes a plurality of elongated bars as part of each tile with rigid inserts such as steel rods. These tiles are permanently installed using extremely strong adhesive. In 1989 Adams received U.S. Pat. No. 4,813,811 for a prefabricated speed bump designed to be permanently attached to pavement. Steinhardt received U.S. Pat. No. 5,059,060 for an improved speed bump permanently mounted in a recess in the roadway and selectively retractable.

It is accordingly an object of the present invention to provide a pre-rolled portable warning device capable of deployment upon a roadway of any surface characteristics using a frangible retaining ring.

It is another object of this invention to provide a device as in the foregoing object which produces sound and mechanical vibration when the wheels of a vehicle roll thereover.

It is a further object of the invention to provide a device of the aforesaid nature capable of functioning by deployment on top of accumulations of ice or snow.

It is still another object of the present invention to provide a device of the aforesaid nature capable of being quickly deployed from a compact rolled-up storage state using a manual operation such as tearing a frangible retaining ring.

An additional object of this invention is to provide an improved warning device of the aforementioned nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved non-permanent portable highway warning device which comprises a mat having substantially flat upper and lower surfaces, fabricated of a flexible resilient composition and having an elongated rectangular periphery characterized in having a long length direction and shorter width direction, and a series of semi-rigid hollow cylindrical strips of uniform elongated rectangular periphery characterized in having a long length direction and shorter height direction and having a cylindrical aperture extending there thru, the aperture in each of the strips being filled with a rigid bar, the strips being integrally attached in a parallel array to the mat, extending upwardly in a semi-circular cross section in their height direction from the upper surface of the mat, extending in their length direction in the width direction of the mat, and spaced apart in the length direction of the mat a uniform distance substantially more than the height of the strips, whereby when the device is placed with the lower surface of the mat resting upon a roadway surface and the length direction oriented parallel to the direction of vehicular travel, passage of the wheels of a vehicle across the array of strips causes momentary downward deflection of the rigid bars inserted in the strips, resulting in flexure and vibration of the rigid rods that which produces a discernible sound and mechanical vibration in the overpassing vehicle In preferred embodiments the ratio of the width to length directions of the mat will be in the range of about 6.0 to 8.0. The mat may be provided with vertical apertures (not shown) to provide drainage of rainwater and to minimize the possibility that the device will contribute to the build up of rainwater or melted snow on the roadway. The device is constructed sufficiently thin and with sufficiently small segments of broken rods, for example ½ to one inch long segments to permitting rolling of the entire length to insure a lengthwise direction of at least 6 feet and yet facilitate storage in a trunk of a full-sized automobile.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a perspective view of a lengthwise section of an embodiment of the novel portable warning device of the present invention showing segmented metal rods embedded therein.

FIG. 2 is a top plan view of the portion of the embodiment of FIG. 1

FIG. 3 is an side view thereof.

FIG. 4 is a side view of the frangible retaining ring device.

FIG. 5 is a perspective view of the novel portable warning device rolled-up in a frangible retaining ring.

FIG. 6 is a view of a cross-section of a segment of the frangible retaining device.

DESCRIPTION OF THE PREFERRED EMBODIMENT

Referring to FIGS. 1 to 3, an embodiment of the portable device of this invention is shown comprised of mat 10 and a series of identical strips 11 having a rectangular perimeter at their bases and attached to and extending vertically upward from said mat with a simi-circular vertical cross section. Each strip 11 has a cylindrical aperture extending therethru.

The mat 10 is defined by [a] substantially flat parallel upper and lower surfaces 12 and 13,respectively, and a rectangular periphery comprised of relatively short edges 20 and 22 and lengthwise edges 24 and |short edges| 25.

The lengthwise edges 24 and 25 are oriented perpendicular or transverse to the direction of anticipated vehicle travel when the mat 10 is in use.

The thickness of the mat, measured perpendicularly between said upper and lower surfaces 12 and 13, ranges preferably between about ⅛" and ½". Beveled edges 16 and 18, which define and further extend the length direction of the mat 10, are preferably about one to three inches in width. The relatively short edges 20 and 22, which define the width or distanced travelled over the mat 10, are between about 2 and 3 feet. The ratio of the length to width directions of the preferred portable mat 10 is about 3.0.

The mat is fabricated of a resilient synthetic polymer material not subject to embrittlement at low temperatures. Suitable materials include synthetic and natural rubbers, elastomeric polymers derived from butadiene, isoprene and chloroprene, ionomer resins, vinyl copolymers, and polyurethanes.

Each panel has spaced apart sides defined by side edges 20 and 22, front and rear edges 24 and 25 and inner front and rear edges 26 and 28. The lower edges of the rectangular strips 11 are attached to the mat 10 in a manner whereby the rectangular strips 11 extend vertically upward from the upper surface of the mat in a parallel array oriented transverse to the direction of vehicle as shown in FIG. 1. The height of each panel measured perpendicularly between upper and lower edges thereof, is between I and 2.5 inches. The thickness of the rectangular strips 11 may range from about ¼" to 2 ¼". The lateral spacing between the rectangular strips 11 is substantially larger than their heights so that audible and vibrational signals are generated and detectable by occupants of overpassing vehicles at speeds in excess of 120 feet per second.

In the preferred embodiment, each strip is comprised of a lengthwise half cylinder of about one inch, each separated in the length direction by a crucial length, measured in the length direction, of between about 1.5 to 2.0 inches. The overall length of the rectangular strips 11, measured between outer end edges 20 and 22, is substantially the same as the length of the mat 10. Because of its length, with careful placement it is unlikely that the wheels of a vehicle will miss contacting a deployed device.

The rectangular strips 11 are fabricated of a rigid material having sufficient toughness to resist fracture upon impact at low temperatures. Suitable materials include metals such as aluminum, fiber-reinforced composites utilizing cross-linked epoxy and polyester compositions, a engineering grade moldable resins such as polycarbonates, polyamides, and polymethylene acetals.

It is critical that rods 50 be segmented or broken into individual segment 51, approximately 1 inch long or less. The rods 50 may be made of steel or Teflon ,i.e., an insoluble polytetrafluoroethylene polymer for example. The rods 50 as segmented may be inserted in the cylindrical aperture , 52 formed in the strips 11. This association with the mat 10 can be accomplished by forced insertion of each of the segments 51 forming the rods 50, or by embedment means wherein the mat 10 has been cast around the properly positioned segmented rods 50. Unless the rods are segmented the capacity of the mat 10 to be rolled up and stored in a trunk of a vehicle is destroyed.

An example of a rolled-up mat 10 is shown in FIG. 5. There an O-shaped retaining ring 60, a bracelet for example, is inserted around the rolled-up mat 10 and compactly retains the mat 10 until used.

To facilitate quick deployment of the mat 10 the O-shaped retaining ring 60, as shown in FIGS. 4, 5, and 6, is adapted with a frangible portion 62 which may be manually broken but which has sufficient tensile strength to retain the rolled-up mat 10 without breaking due to the natural elastomeric force exhibited by the tendency of the mat 10 to unfurl or unroll. A circular or round cross section is specifically selected for the O-shaped ring 60 as shown in FIG. 6b. With the application of a minimal amount of a lubricant, such as oil or petroleum jelly for example, a new ring 60 may easily slipped onto the rolled-up mat 10 after it is taken up from a roadway for redeployment elsewhere.

In operation, when a tire (not shown) of a vehicle rolls transversely across the parallel array rectangular strips I1, each strip 11 and each rod 50 therein, in turn is downwardly deflected. Such deflection causes each rod 50 and the segments 51 making up each rod 50 and each strip to produce an audible sound as well as a palpable vibration a occupant of the vehicle (not shown). In addition, deflection of the strips 11 causes some the ends of the segments 51 frictionally engage creating a greatly enhanced audible sound. The rolling movement of the tire across the rectangular strips 11 produce e a vibration within the vehicle that can be felt by the driver using only the frictional movement of the segments 51 and with no other interaction of parts of the mat 11. These audible and vibratory effects serve to alert the driver of potential road hazards ahead or of the presence of law enforcement personnel ahead.

The device may also be distinctly colored so that under conditions of favorable visibility they additionally provide a visual warning.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the novel invention.

What is claimed is:

1. An improved portable highway warning device comprising
   (a) a mat having substantially flat upper and lower surfaces, fabricated of a flexible resilient composition and having an elongated rectangular periphery characterized in having a width direction parallel to the direction of travel and a length direction transverse to the direction of travel, and
   (b) a series of substantially rigid strips of uniform elongated rectangular periphery characterized in having a long length direction and shorter height direction, said strips being attached in a parallel array to said mat, extending upwardly in their height direction from the upper surface of said mat, extending in their length direction in the length direction of said mat, and spaced apart in the width direction of said mat a uniform distance greater than the height of said strips, said strips being hollow; and
   (c) a segmented rod located inside each said strip, said segmented rod comprising a plurality of adjacent end-to-end segments; whereby
   (d) when the device is placed with the lower surface of the mat resting upon a roadway surface and the length direction oriented transversely to the direction of vehicular travel, passage of the wheels of a vehicle across said array of strips causes momentary differential deflection of said segmented rod, resulting in frictional contact between adjacent ends of said segments which contact produces a discernible sound.

2. The device of claim 1 wherein each segmented rod is made of stainless steel.

3. The device of claim 1 wherein each segmented rod is made of metal.

4. The device of claim 1 wherein at least one segmented rod is made of metal.

5. The device of claim 1 wherein some of the segmented rods are made of Teflon and the remainder are made of stainless steel.

6. An improved portable highway warning device comprising
   (a) a mat fabricated of a flexible resilient composition and having an elongated rectangular periphery characterized in having a width direction parallel to the direction of travel and a length direction transverse to the direction of travel, and
   (b) a series of strips of uniform elongated rectangular periphery characterized in having a long length direction and shorter height direction, said strips being attached in a parallel array to said mat extending in their length direction in the length direction of said mat, and spaced apart in the width direction of said mat a uniform distance, said strips being hollow; and
   (c) a segmented rod located inside each said strip, said segmented rod comprising a plurality of adjacent end-to-end segments ; whereby
   (d) when the device is placed with the lower surface of the mat resting upon a roadway surface and the length direction oriented transversely to the direction of vehicular travel, passage of the wheels of a vehicle across said array of strips causes momentary differential deflection of said segmented rod, resulting in frictional contact between adjacent ends of said segments which contact produces a discernible sound.

* * * * *